United States Patent
Li et al.

(10) Patent No.: US 10,153,936 B2
(45) Date of Patent: Dec. 11, 2018

(54) METHOD OF REDUCING IMPACT OF D2D IN-BAND INTERFERENCE ON CELLULAR TRANSMISSION

(71) Applicant: Alcatel Lucent, Boulogne Billancourt (FR)

(72) Inventors: Dong Li, Shanghai (CN); Yong Liu, Shanghai (CN)

(73) Assignee: Alcatel Lucent, Boulogne Billancourt (FR)

( * ) Notice: Subject to any disclaimer, the term of this patent is extended or adjusted under 35 U.S.C. 154(b) by 13 days.

(21) Appl. No.: 15/500,692

(22) PCT Filed: Aug. 3, 2015

(86) PCT No.: PCT/IB2015/001546
§ 371 (c)(1),
(2) Date: Jan. 31, 2017

(87) PCT Pub. No.: WO2016/020754
PCT Pub. Date: Feb. 11, 2016

(65) Prior Publication Data
US 2017/0222862 A1 Aug. 3, 2017

(30) Foreign Application Priority Data

Aug. 7, 2014 (CN) .......................... 2014 1 0386985

(51) Int. Cl.
*H04W 4/00* (2018.01)
*H04L 29/08* (2006.01)
(Continued)

(52) U.S. Cl.
CPC ....... *H04L 29/08333* (2013.01); *H04B 7/024* (2013.01); *H04L 67/1046* (2013.01);
(Continued)

(58) Field of Classification Search
None
See application file for complete search history.

(56) References Cited

U.S. PATENT DOCUMENTS 9,591,671 B2   3/2017  Yamazaki et al.
2013/0010618 A1  1/2013  Wang et al.
(Continued)

FOREIGN PATENT DOCUMENTS

CN   103493529 A   1/2014
CN   103843444 A   6/2014
(Continued)

OTHER PUBLICATIONS

Intel Corporation, "Type 2B resource allocation for D2D discovery," 3rd Generation Partnership Project (3GPP), 3GPP TSG-RAN WG2 Meeting #85, R2-140302, XP050791696, pp. 1-4, Prague, Czech Republic, Feb. 10-14, 2014.
(Continued)

*Primary Examiner* — Zewdu A Beyen
(74) *Attorney, Agent, or Firm* — Fay Sharpe LLP (57) ABSTRACT

The invention relates to a method implemented in a base station of a wireless communication system, of reducing impact of D2D in-band interference on cellular transmission, the method comprising the following step of:
the base station sending a first message to a user equipment to configure a D2D discovery resource pool as a resource pool including a first zone and a second zone, wherein the first zone is a restricted D2D resource zone and the second zone is an unrestricted D2D resource zone, and wherein the first zone and the second zone possess an interleaving arrangement. In the method according to the present invention, the first zone and the second zone possess an interleaving arrangement and
(Continued)

thus loss in downlink throughput is reduced and the impact of D2D in-band interference on cellular transmission is reduced.

14 Claims, 4 Drawing Sheets

(51) Int. Cl.

| | | |
|---|---|---|
| H04W 8/00 | (2009.01) | |
| H04W 4/70 | (2018.01) | |
| H04B 7/024 | (2017.01) | |
| H04W 28/02 | (2009.01) | |
| H04W 36/00 | (2009.01) | |
| H04W 84/22 | (2009.01) | |
| H04W 72/02 | (2009.01) | |

(52) U.S. Cl.
CPC ............ *H04W 4/70* (2018.02); *H04W 8/005* (2013.01); *H04W 28/021* (2013.01); *H04W 36/0022* (2013.01); *H04W 84/22* (2013.01); *H04W 72/02* (2013.01)

(56) References Cited

U.S. PATENT DOCUMENTS

| | | |
|---|---|---|
| 2013/0288608 A1 | 10/2013 | Fwu et al. |
| 2014/0038653 A1 | 2/2014 | Mildh et al. |
| 2014/0056220 A1 | 2/2014 | Poitau et al. |
| 2014/0094183 A1 | 4/2014 | Gao et al. |
| 2015/0223147 A1 | 8/2015 | Fujishiro et al. |
| 2015/0256584 A1 | 9/2015 | Sakaguchi et al. |
| 2015/0326362 A1* | 11/2015 | Xiong ............... H04W 8/005 370/336 |

FOREIGN PATENT DOCUMENTS

| | | |
|---|---|---|
| JP | 2014-524199 | 9/2014 |
| WO | WO 2013/006652 | 1/2013 |
| WO | WO 2014/034286 | 3/2014 |
| WO | WO 2014050556 A1 | 4/2014 |
| WO | WO 2014030580 | 7/2014 |

OTHER PUBLICATIONS

LG Electronics, "Operation in Type 1 Resource Allocation for D2D Discovery," $3^{rd}$ Generation Partnership Project (3GPP), 3GPP TSG RAN WG1, R1-142149, XP050789269, pp. 1-11, Seoul, Korea, May 19-23, 2014.
ETRI, "Resource allocation for D2D discovery," $3^{rd}$ Generation Partnership Project (3GPP), 3GPP TSG RAN WG1 Meeting #76, XP050751874, pp. 1-7, Prague, Czech Republic, Feb. 10-14, 2014.
International Search Report for PCT/IB2015/001546 dated Jan. 8, 2016.
Samsung, Evaluation of D2D impat on WAN: PUCCH performance, 3GPP TSG RAN WG1 #77, R1-142115.
Kyocera, Coexistence of D2D discovery and WAN, 3GPP TSG RAN WG1, #77, R1-142485.
Alcatel-Lucent Shanghai Bell, Alcatel-Lucent, Evaluation of Impact of D2D to WAN system performance, 3GPP TSG RAN WG1, #77, R1-142059.

* cited by examiner

METHOD OF REDUCING IMPACT OF D2D IN-BAND INTERFERENCE ON CELLULAR TRANSMISSION

FIELD OF THE INVENTION

The present invention relates to the technology field of wireless communication, and particularly to a method of reducing impact of D2D in-band interference on cellular transmission in base station or user equipment.

BACKGROUND OF THE INVENTION

Figure 1:
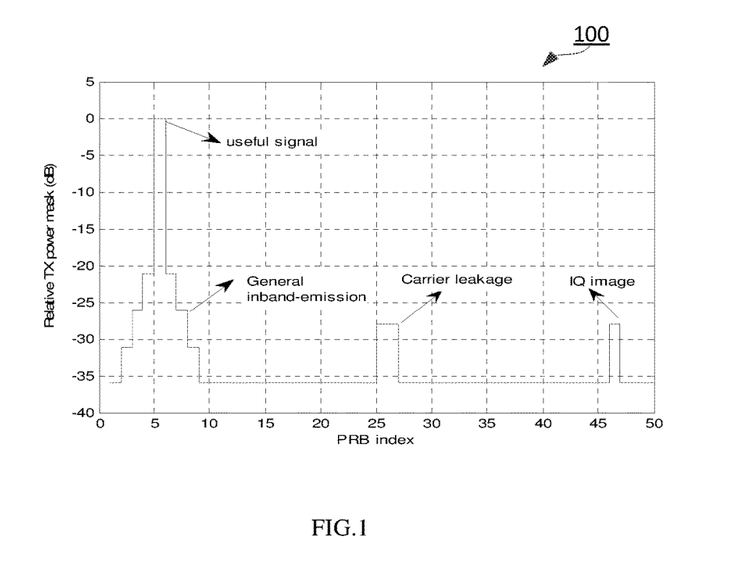
FIG. 1 illustrates a schematic diagram 100 of interference generated due to signal power leakage in the prior art.
Figure 2:
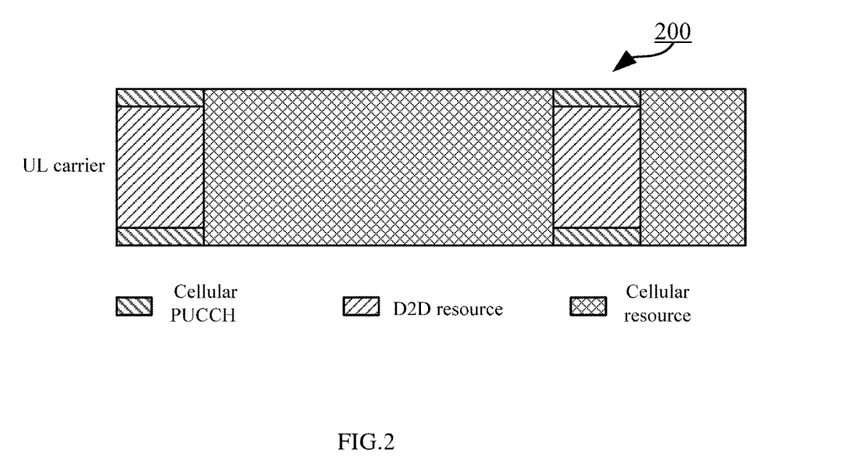
FIG. 2 illustrates a schematic diagram 200 of D2D resource pool configuration in the prior art.

In LTE D2D study, it was decided that the D2D signals occupy part of uplink cellular resources (i.e., uplink carriers for FDD and uplink subframes for TDD), as shown in FIG. 2 for the case of FDD. In particular, the D2D signals will occupy some periodical uplink subframes. In order to support the normal downlink cellular transmissions, the uplink cellular control signals (i.e., PUCCH) still have to be transmitted. That is to say in the D2D subframes the cellular PUCCH signals have to be multiplexed with D2D signals through FDM, as shown in FIG. 2. On the other hand, according to the in-band emission interference modeling as described in 3GPP TR38.843 V12.0.1, "Study on LTE Device to Device Proximity Services—radio aspects", the cellular PUCCH signals suffer from the in-band interference from the D2D signals. FIG. 1 shows an example of in-band emission interference model.

Since the uplink PUCCH signals (e.g., ACK/NACK, CQI feedback etc. depending on the PUCCH format) play an important role in supporting the downlink data transmission, the in-band emission interference from D2D signals to the cellular control signals has to be solved. This invention aims to address this technical problem.

FIG. 1 illustrates an example of in-band interference, based on the modeling method described in 3GPP TR38.843 V12.0.1, "Study on LTE Device to Device Proximity Services—radio aspects" with updated parameters {W,X,Y, Z}={3,6,3,3}.

Up to now, the best existing solution of this problem is through usage of power control for the D2D signal. Such a technical solution is disclosed by the application with the application number 201410041266.0 titled "method of controlling transmission power" and the application with the application number 201410192499.0 titled "method of reducing Impact of D2D In-Band Interference on Cellular Transmission".

In the first patent application, namely for the power control method, the solution works well in controlling the in-band emission interference to uplink cellular signals. However, it has some disadvantages. The main disadvantage is that by using power control, the D2D signal transmission powers are not uniform for different D2D users (the closer to base station, is the lower the D2D signal transmission power is), thus the D2D transmission range is not uniform. This is not a desirable property for D2D transmissions.

For the restricted resource selection method proposed in the second patent application, the configured D2D subframes are divided into two groups, each group constitutes a number of contiguous subframes, as per the configuration of base station. The D2D users near the base station can only select D2D resources for transmission from one group (say group 1) while the D2D users far from the base station can only select D2D transmission resource from another group (say group 2), such that the in-band interference from the D2D users to the base station is mainly limited to the D2D resource group 1. The main disadvantages of this method are that although the in-band interference to the D2D resource group 2 is largely alleviated, the in-band interference over the D2D resource group 1 is further degraded such that the base station may hardly decode the received PUCCHs over the subframes of D2D resource group 1. Since the uplink PUCCHs may convey the information of ACK/NACK, CQI feedback, and so on, the collapse of the PUCCH detection will lead to loss in downlink throughput.

SUMMARY OF THE INVENTION

Based on the prior art described in the part background of the invention and the technical understanding of the existing technical problem, the present invention proposes a method, implemented in a base station of a wireless communication system, of reducing impact of D2D in-band interference on cellular transmission, the method comprises the following step of:

the base station sending a first message to a user equipment to configure a D2D discovery resource pool as a resource pool including a first zone and a second zone, wherein the first zone is a restricted D2D resource zone and the second zone is an unrestricted D2D resource zone, is and wherein the first zone and the second zone possess an interleaving arrangement.

In the method according to the present invention, the first zone and the second zone possess an interleaving arrangement and thus loss in downlink throughput is reduced and the impact of D2D in-band interference on cellular transmission is reduced.

In one embodiment of the present invention, the first message indicates an interval and a sum of subframes of the interleaving arrangement of the first zone and/or the second zone in the D2D discovery resource pool.

In such a manner the base station could inform the user equipment an interval and a sum of subframes of the interleaving arrangement of the first zone and/or the second zone in the D2D discovery resource pool, for example, 1/1, 2/1 or 1/3 etc.

In one embodiment of the present invention, the first message includes a starting position of the first and/or the second zone in the D2D discovery resource pool. Those skilled in the art should understand that the starting position is optional and it could be not included in case that the specification specifies it.

In one embodiment of the present invention, the method further comprises:

dividing user equipments communicatively connected to the base station into two groups according to the specification version of the user equipments, wherein a first group is the user equipment using the specification version before release 12 and a second group is the user equipment using the specification version of release 12 or the specification version after release 12;

the base station performing restricted downlink data scheduling within the timing associated with the configured D2D discovery resource pool for the user equipments in the first group, such that feedback of the data scheduling can be transmitted on the subframe in the second zone is which is unrestricted D2D resource zone and/or the base station performing normal downlink data scheduling in the timing associated with the configured D2D discovery resource pool for the user equipments in the second group and adjusting the feedback timing of the user equipments, which needs to transmit feedback on the subframe in the first zone according to normal ACK/NACK feedback sequence, to the subframe in the nearest next second zone to transmit the feedback.

In one embodiment of the present invention, in FDD system the base station induces the downlink data of the user equipments in the first group to be transmitted on the nth downlink subframe if the $(n+4)^{th}$ uplink subframe is the subframe on which the unrestricted D2D resource zone locates.

In one embodiment of the present invention, user equipment of cellular transmission adopts Frequency Division Multiplexing on the subframe in the second zone which is unrestricted D2D resource zone, to transmit the ACK/NACK feedback of the downlink data scheduling and D2D signal of D2D user equipment.

In one embodiment of the present invention, D2D neighbor discovery user equipment determines the user equipments as a first type of user equipment or a second type of user equipment according to downlink reference signal measuring result and threshold parameter sent by the base station, wherein
  the resource in the first zone is configured for the first type of user equipment and the first type of user equipment locates at the center of a cell and the first type of user equipment is configured to be just able to use the resource in the restricted D2D resource zone of the first zone for D2D transmission;
  the resource in the second zone is configured for the second type of user equipment and the second type of user equipment locates at the edge of the cell and the second type of user equipment is configured to be just able to use the resource in the unrestricted D2D resource zone of the is second zone for D2D transmission.

Those skilled in the art should understand that the first type of user equipment and the second type of user equipment here are not equal to the first group and the second group mentioned above. The first type of user equipment refers to the user equipment locates at the center of a cell namely the user equipment near the base station and the second type of user equipment refers to the user equipment locates at the edge of a cell namely the user equipment far from the base station.

The second aspect of the invention proposes a method, implemented in a user equipment of a wireless communication system, of reducing impact of D2D in-band interference on cellular transmission, the method comprising:
  receiving a first message from a base station to configure a D2D discovery resource pool as a resource pool including a first zone and a second zone, wherein the first zone is a restricted D2D resource zone and the second zone is an unrestricted D2D resource zone, and wherein the first zone and the second zone possess an interleaving arrangement.

In one embodiment of the present invention, the first message indicates an interval and a sum of subframes of the interleaving arrangement of the first zone and/or the second zone in the D2D discovery resource pool.

In one embodiment of the present invention, the first message includes a starting position of the first and/or the second zone in the D2D discovery resource pool.

In one embodiment of the present invention, the method further comprises:
  dividing user equipments communicatively connected to the base station into two groups according to the specification version of the user equipments, wherein a first group is the user equipment using the specification version before release 12 and a second group is the user equipment using the specification version of release 12 or the is specification version after release 12;
  performing restricted downlink data scheduling within the timing associated with the configured D2D discovery resource pool if the user equipment is the user equipment in the first group, such that feedback of the data scheduling can be transmitted on the subframe in the second zone which is unrestricted D2D resource zone and/or performing normal downlink data scheduling within the timing associated with the configured D2D discovery resource pool if the user equipment is the user equipment in the second group and adjusting the feedback timing for the user equipment, which needs to transmit feedback on the subframe in the first zone according to normal ACK/NACK feedback timing, to the subframe in the nearest next second zone to transmit the feedback.

In one embodiment of the present invention,
  if the downlink data of the user equipment belonging to the second group is transmitted on the nth subframe and the (n+4)th subframe is the subframe on which the unrestricted D2D resource zone locates, then the feedback timing of the data scheduling is not adjusted in the feedback timing adjustment of the data scheduling; and
  if the downlink data of the user equipment belonging to the second group is transmitted on the nth subframe and the (n+4)th subframe is the subframe on which the restricted D2D resource zone locates and the (n+5)th subframe is the subframe on which the unrestricted D2D resource zone locates, then the (n+5)th subframe is adjusted to be used for sending the feedback of the data scheduling in the feedback timing adjustment of the data scheduling.

In one embodiment of the present invention, the user equipment of cellular transmission adopts Frequency Division Multiplexing on the subframe in the second zone which is unrestricted D2D resource zone, to transmit the ACK/NACK feedback of the downlink data scheduling and D2D signal of D2D user equipment.

In one embodiment of the present invention, D2D neighbor discovery is user equipment determines the user equipments as a first type of user equipment or a second type of user equipment according to downlink reference signal measuring result and threshold parameter sent by the base station, wherein
  the resource in the first zone is configured for the first type of user equipment and the first type of user equipment locates at the center of a cell and the first type of user equipment is configured to be just able to use the resource in the restricted D2D resource zone of the first zone for D2D transmission;
  the resource in the second zone is configured for the second type of user equipment and the second type of user equipment locates at the edge of the cell and the second type of user equipment is configured to be just able to use the resource in the unrestricted D2D resource zone of the second zone for D2D transmission.

In the method according to the present invention, the first zone and the second zone possess an interleaving arrangement and thus loss in downlink throughput is reduced and the impact of D2D in-band interference on cellular transmission is reduced.

BRIEF DESCRIPTION OF DRAWINGS

Other features, objects and advantages of the invention will become more apparent upon review of the following detailed description of non-limiting embodiments taken with reference to the drawings in which.

Identical or similar devices (modules) or steps will be denoted by identical or similar reference numerals throughout the drawings.

DETAILED DESCRIPTION OF EMBODIMENTS

The above described particular description of preferred embodiments will be given with reference to the drawings constituting a part of the invention. The drawings exemplarily illustrate particular embodiments, in which the invention can be practiced. The exemplary embodiments are not intended to exhaust all the embodiments of the invention. As can be appreciated, other embodiments can be possible or structural or logical modifications can be made without departing from the scope of the invention. Thus the following detailed description is not intended to be limiting, and the scope of the invention will be defined as in the appended claims.

Figure 3:
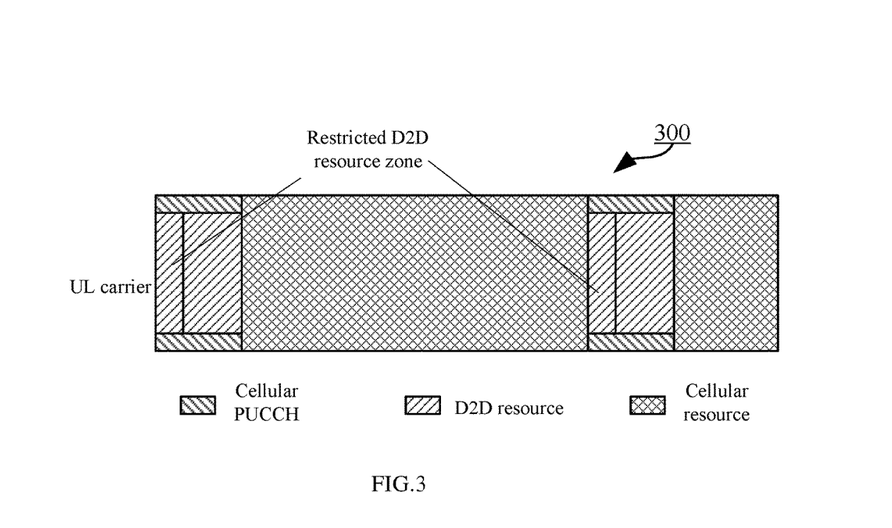
FIG. 3 illustrates another schematic diagram 300 of D2D resource pool configuration in the prior art.

FIG. 1 illustrates a schematic diagram 100 of interference generated due to signal power leakage in the prior art. FIG. 2 illustrates a schematic diagram 200 of D2D resource pool configuration in the prior art. FIG. 3 illustrates another schematic diagram 300 of D2D resource pool configuration in the prior art. All these three figures are described in the background of the invention and thus repeated description is here omitted.

This invention proposes a scheme to address the in-band interference of D2D signal to cellular signals to a large extent. The following FIGS. 4-7 only illustrate the D2D resource portion in FIG. 3 and other portions are not shown.

Figure 4:
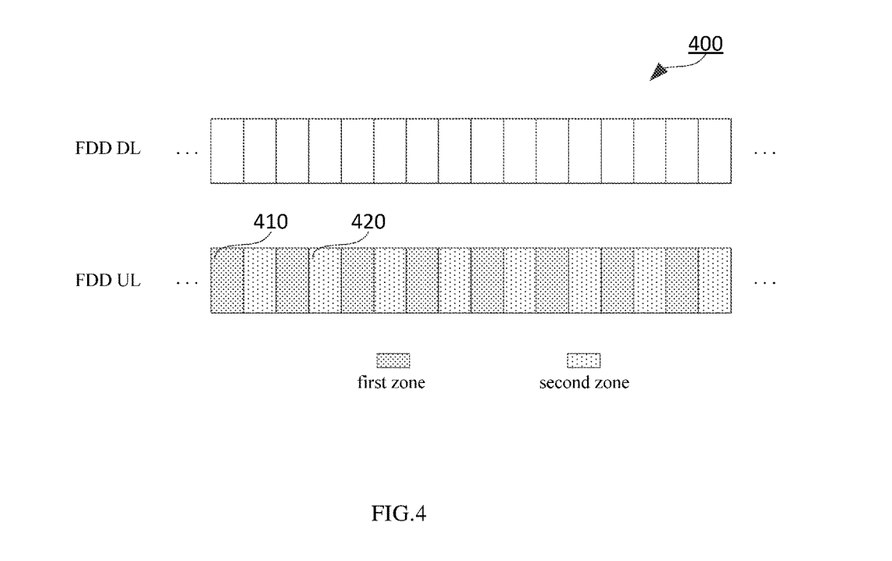
FIG. 4 illustrates a schematic diagram 400 of D2D resource pool configuration according to the present invention.
Figure 5:
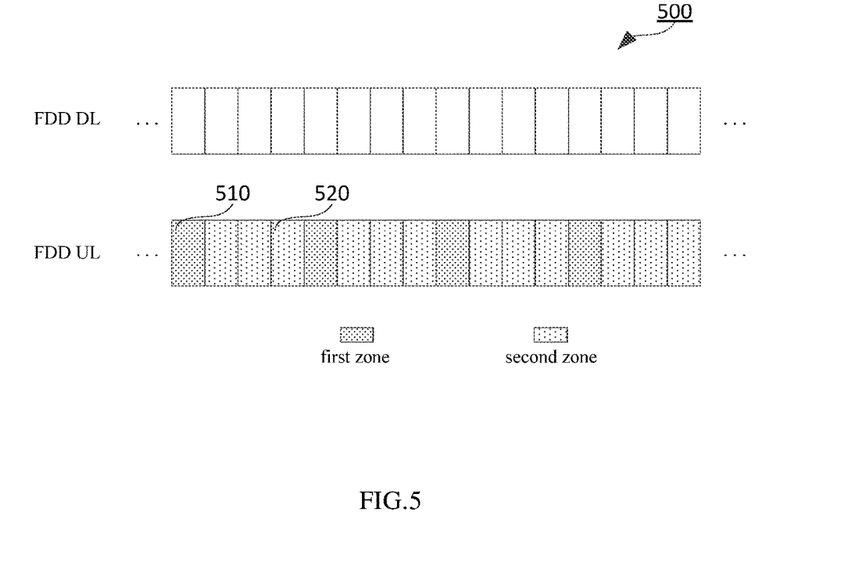
FIG. 5 illustrates another schematic diagram 500 of D2D resource pool configuration according to the present invention.

FIG. 4 illustrates a schematic diagram 400 of D2D resource pool configuration according to the present invention and FIG. 5 illustrates another schematic diagram 500 of D2D resource pool configuration according to the present invention. As can be seen from FIG. 4 and FIG. 5, the first zone and second zone in the D2D resource possess interleaving arrangement and the proportion there between could be 1/1 and 1/3,namely they contains discrete subframe but not continuous subframes as shown in FIG. 3.

Figure 6:
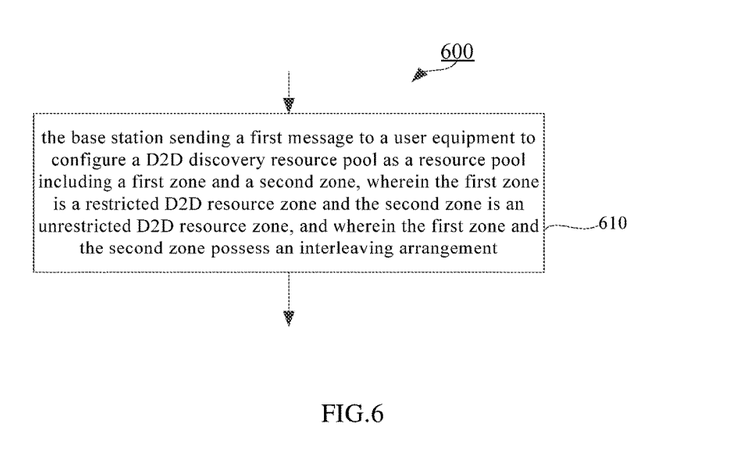
FIG. 6 illustrates a flow chart 600 of a method, implemented in a base station of a wireless communication system, of reducing impact of D2D in-band interference on cellular transmission.

FIG. 6 illustrates a flow chart 600 of a method, implemented in a base station of a wireless communication system, of reducing impact of D2D in-band interference on cellular transmission. As shown in FIG. 6, a method, implemented in a base station of a wireless communication system, of reducing impact of D2D in-band interference on cellular transmission, comprises the following step 610:

the base station sending a first message to a user equipment to configure a D2D discovery resource pool as a resource pool including a first zone and a second zone, wherein the first zone is a restricted D2D resource zone and the second zone is an unrestricted D2D resource zone, and wherein the first zone and the second zone possess an interleaving arrangement.

In the method according to the present invention, the first zone and the second zone possess an interleaving arrangement and thus loss in downlink throughput is reduced and the impact of D2D in-band interference on cellular transmission is reduced.

In one embodiment of the present invention, the first message indicates an interval and a sum of subframes of the interleaving arrangement of the first zone and/or the second zone in the D2D discovery resource pool.

In such a manner the base station could inform the user equipment an interval and a sum of subframes of the interleaving arrangement of the first zone and/or the second zone in the D2D discovery resource pool, for example, 1/1, 2/1 or 1/3 etc. is In one embodiment of the present invention, the first message includes a starting position of the first and/or the second zone in the D2D discovery resource pool. Those skilled in the art should understand that the starting position is optional and it could be not included in case that the specification specifies it. In one embodiment of the present invention, the method further comprises:

dividing user equipments communicatively connected to the base station into two groups according to the specification version of the user equipments, wherein a first group is the user equipment using the specification version before release 12 and a second group is the user equipment using the specification version of release 12 or the specification version after release 12;

the base station performing restricted downlink data scheduling within the timing associated with the configured D2D discovery resource pool for the user equipments in the first group, such that feedback of the data scheduling can be transmitted on the subframe in the second zone which is unrestricted D2D resource zone and/or the base station performing normal downlink data scheduling in the timing associated with the configured D2D discovery resource pool for the user equipments in the second group and adjusting the feedback timing of the user equipments, which needs to transmit feedback on the subframe in the first zone according to normal ACK/NACK feedback sequence, to the subframe in the nearest next second zone to transmit the feedback.

In one embodiment of the present invention, in FDD system the base station induces the downlink data of the user equipments in the first group to be transmitted on the nth downlink subframe if the (n+4)th uplink subframe is the subframe on which the unrestricted D2D resource zone locates.

In one embodiment of the present invention, user equipment of cellular transmission adopts Frequency Division Multiplexing on the subframe in the second zone which is unrestricted D2D resource zone, to is transmit the ACK/NACK feedback of the downlink data scheduling and D2D signal of D2D user equipment.

In one embodiment of the present invention, D2D neighbor discovery user equipment determines the user equipments as a first type of user equipment or a second type of user equipment according to downlink reference signal measuring result and threshold parameter sent by the base station, wherein the resource in the first zone is configured for the first type of user equipment and the first type of user equipment locates at the center of a cell and the first type of user equipment is configured to be just able to use the resource in the restricted D2D resource zone of the first zone for D2D transmission;

the resource in the second zone is configured for the second type of user equipment and the second type of user equipment locates at the edge of the cell and the second type of user equipment is configured to be just able to use the resource in the unrestricted D2D resource zone of the second zone for D2D transmission.

Those skilled in the art should understand that the first type of user equipment and the second type of user equipment here are not equal to the first group and the second group mentioned above. The first type of user equipment refers to the user equipment locates at the center of a cell namely the user equipment near the base station and the second type of user equipment refers to the user equipment locates at the edge of a cell namely the user equipment far from the base station.

Figure 7:
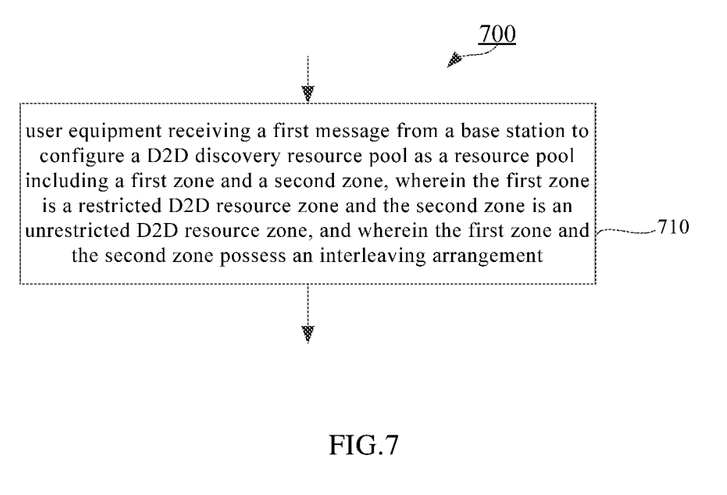
FIG. 7 illustrates a flow chart 700 of a method, implemented in a user equipment of a wireless communication system, of reducing impact of D2D in-band interference on cellular transmission.

FIG. 7 illustrates a flow chart 700 of a method, implemented in a user equipment of a wireless communication system, of reducing impact of D2D in-band interference on cellular transmission. As shown in FIG. 7, a method, implemented in a user equipment of a wireless communication system, of reducing impact of D2D in-band interference on cellular transmission, comprises the step 710:

receiving a first message from a base station to configure a D2D discovery resource pool as a resource pool including a first zone and a is second zone, wherein the first zone is a restricted D2D resource zone and the second zone is an unrestricted D2D resource zone, and wherein the first zone and the second zone possess an interleaving arrangement.

In one embodiment of the present invention, the first message indicates an interval and a sum of subframes of the interleaving arrangement of the first zone and/or the second zone in the D2D discovery resource pool.

In one embodiment of the present invention, the first message includes a starting position of the first and/or the second zone in the D2D discovery resource pool.

In one embodiment of the present invention, the method further comprises:

dividing user equipments communicatively connected to the base station into two groups according to the specification version of the user equipments, wherein a first group is the user equipment using the specification version before release 12 and a second group is the user equipment using the specification version of release 12 or the specification version after release 12;

performing restricted downlink data scheduling within the timing associated with the configured D2D discovery resource pool if the user equipment is the user equipment in the first group, such that feedback of the data scheduling can be transmitted on the subframe in the second zone which is unrestricted D2D resource zone and/or performing normal downlink data scheduling within the timing associated with the configured D2D discovery resource pool if the user equipment is the user equipment in the second group and adjusting the feedback timing for the user equipment, which needs to transmit feedback on the subframe in the first zone according to normal ACK/NACK feedback timing, to the subframe in the nearest next second zone to transmit the feedback.

In one embodiment of the present invention, if the downlink data of the user equipment belonging to the second group is transmitted on the nth subframe and the (n+4)th subframe is the is subframe on which the unrestricted D2D resource zone locates, then the feedback timing of the data scheduling is not adjusted in the feedback timing adjustment of the data scheduling; and if the downlink data of the user equipment belonging to the second group is transmitted on the nth subframe and the (n+4)th subframe is the subframe on which the restricted D2D resource zone locates and the (n+5)th subframe is the subframe on which the unrestricted D2D resource zone locates, then the (n+5)th subframe is adjusted to be used for sending the feedback of the data scheduling in the feedback timing adjustment of the data scheduling.

In one embodiment of the present invention, the user equipment of cellular transmission adopts Frequency Division Multiplexing on the subframe in the second zone which is unrestricted D2D resource zone, to transmit the ACK/NACK feedback of the downlink data scheduling and D2D signal of D2D user equipment.

In one embodiment of the present invention, D2D neighbor discovery user equipment determines the user equipments as a first type of user equipment or a second type of user equipment according to downlink reference signal measuring result and threshold parameter sent by the base station, wherein the resource in the first zone is configured for the first type of user equipment and the first type of user equipment locates at the center of a cell and the first type of user equipment is configured to be just able to use the resource in the restricted D2D resource zone of the first zone for D2D transmission;

the resource in the second zone is configured for the second type of user equipment and the second type of user equipment locates at the edge of the cell and the second type of user equipment is configured to be just able to use the resource in the unrestricted D2D resource zone of the second zone for D2D transmission.

In the method according to the present invention, the first zone and the second zone possess an interleaving arrangement and thus loss in downlink throughput is reduced and the impact of D2D in-band interference on cellular transmission is reduced.

Those skilled in the art shall appreciate that the invention apparently will not be limited to the foregoing exemplary embodiments and can be embodied in other specific forms without departing from the spirit or essence of the invention. Accordingly the embodiments shall be construed anyway to be exemplary and non-limiting. Moreover apparently the term "comprising" will not preclude another element(s) or step(s), and the term "a" or "an" will not preclude plural. A plurality of elements stated in an apparatus claim can alternatively be embodied as a single element. The terms "first", "second", etc., are intended to designate a name but not to suggest any specific order.

The invention claimed is:

1. A method, implemented in a base station of a wireless communication system, of reducing impact of device-to-device (D2D) in-band interference on cellular transmission, the method comprising:

the base station sending a first message to a user equipment to configure a D2D discovery resource pool as a resource pool including a first zone and a second zone, wherein the first zone is a restricted D2D resource zone and the second zone is an unrestricted D2D resource zone, and wherein the first zone and the second zone possess an interleaving arrangement;

dividing user equipments communicatively connected to the base station into two groups according to a specification version of the user equipments, wherein a first group is the user equipment using a specification version before release 12 and a second group is the user equipment using a specification version of release 12 or a specification version after release 12; and the base station performing restricted downlink data scheduling within the timing associated with the configured D2D discovery resource pool for the user equipments in the first group, such that feedback of the data scheduling can be transmitted on the subframe in the second zone which is an unrestricted D2D resource zone and/or the base station performing normal downlink data scheduling in the timing associated with the configured D2D discovery resource pool for the user equipments in the second group and adjusting the feedback timing of the user equipments, which needs to transmit feedback on the subframe in the first zone according to normal ACK/NACK feedback sequence, to the subframe in the nearest next second zone to transmit the feedback.

2. The method according to claim 1, wherein the first message indicates an interval and a sum of subframes of the interleaving arrangement of the first zone and the second zone in the D2D discovery resource pool.

3. The method according to claim 1, wherein the first message includes a starting position of the first and the second zone in the D2D discovery resource pool.

4. The method according to claim 1, wherein in FDD system the base station induces the downlink data of the user equipments in the first group to be transmitted on the nth downlink subframe if the $(n+4)^{th}$ uplink subframe is the subframe on which the unrestricted D2D resource zone locates.

5. The method according to claim 1, wherein the user equipment of cellular transmission adopts Frequency Division Multiplexing on the subframe in the second zone, which is an unrestricted D2D resource zone, to transmit the ACK/NACK feedback of the downlink data scheduling and D2D signal of D2D user equipment.

6. A method, implemented in a base station of a wireless communication system, of reducing impact of device-to-device (D2D) in-band interference on cellular transmission, the method comprising:

the base station sending a first message to a user equipment to configure a D2D discovery resource pool as a resource pool including a first zone and a second zone, wherein the first zone is a restricted D2D resource zone and the second zone is an unrestricted D2D resource zone, and wherein the first zone and the second zone possess an interleaving arrangement, wherein D2D neighbor discovery user equipment determines the user equipments as a first type of user equipment or a second type of user equipment according to a downlink reference signal measuring result and a threshold parameter sent by the base station, and wherein the resource in the first zone is configured for the first type of user equipment, and the first type of user equipment locates at the center of a cell and is configured to be just able to use the resource in the restricted D2D resource zone of the first zone for D2D transmission;

the resource in the second zone is configured for the second type of user equipment, and the second type of user equipment locates at the edge of the cell and is configured to be just able to use the resource in the unrestricted D2D resource zone of the second zone for D2D transmission.

7. A method, implemented in a user equipment of a wireless communication system, of reducing impact of device-to-device (D2D) in-band interference on cellular transmission, the method comprising:

receiving a first message from a base station to configure a D2D discovery resource pool as a resource pool including a first zone and a second zone, wherein the first zone is a restricted D2D resource zone and the second zone is an unrestricted D2D resource zone, and wherein the first zone and the second zone possess an interleaving arrangement;

dividing user equipments communicatively connected to the base station into two groups according to a specification version of the user equipments, wherein a first group is the user equipment using a specification version before release 12 and a second group is the user equipment using a specification version of release 12 or a specification version after release 12; and performing restricted downlink data scheduling within the timing associated with the configured D2D discovery resource pool if the user equipment is the user equipment in the first group, such that feedback of the data scheduling can be transmitted on the subframe in the second zone which is an unrestricted D2D resource zone and/or performing normal downlink data scheduling within the timing associated with the configured D2D discovery resource pool if the user equipment is the user equipment in the second group and adjusting the feedback timing for the user equipment, which needs to transmit feedback on the subframe in the first zone according to normal ACK/NACK feedback timing, to the subframe in the nearest next second zone to transmit the feedback.

8. The method according to claim 7, wherein the first message indicates an interval and a sum of subframes of the interleaving arrangement of the first zone and the second zone in the D2D discovery resource pool.

9. The method according to claim 7, wherein the first message includes a starting position of the first and the second zone in the D2D discovery resource pool.

10. The method according claim 7, wherein
if the downlink data of the user equipment belonging to the second group is transmitted on the $n^{th}$ subframe and the $(n+4)^{th}$ subframe is the subframe on which the unrestricted D2D resource zone locates, then the feedback timing of the data scheduling is not adjusted in the feedback timing adjustment of the data scheduling; and
if the downlink data of the user equipment belonging to the second group is transmitted on the $n^{th}$ subframe and the $(n+4)^{th}$ subframe is the subframe on which the restricted D2D resource zone locates and the $(n+5)^{th}$ subframe is the subframe on which the unrestricted D2D resource zone locates, then the $(n+5)^{th}$ subframe is adjusted to be used for sending the feedback of the data scheduling in the feedback timing adjustment of the data scheduling.

11. The method according to claim 7, wherein the user equipment of cellular transmission adopts Frequency Division Multiplexing on the subframe in the second zone, which is unrestricted D2D resource zone, to transmit the ACK/NACK feedback of the downlink data scheduling and D2D signal of D2D user equipment.

12. A method, implemented in a user equipment of a wireless communication system, of reducing impact of device-to-device ( D2D) in-band interference on cellular transmission, the method comprising:
receiving a first message from a base station to configure a D2D discovery resource pool as a resource pool including a first zone and a second zone, wherein the first zone is a restricted D2D resource zone and the second zone is an unrestricted D2D resource zone, and wherein the first zone and the second zone possess an interleaving arrangement;
dividing user equipments communicatively connected to the base station into two groups according to a specification version of the user equipments, wherein a first group is the user equipment using a specification version before release 12 and a second group is the user equipment using a specification version of release 12 or a specific version after release 12;
performing restricted downlink data scheduling within the timing associated with the configured D2D discovery resource pool if the user equipment is the user equipment in the first group, such that feedback of the data scheduling can be transmitted on the subframe in the second zone which is an unrestricted D2D resource zone and/or performing normal downlink data scheduling within the timing associated with the configured D2D discovery resource pool if the user equipment is the user equipment in the second group and adjustinq the feedback timing for the user equipment, which needs to transmit feedback on the subframe in the first zone according to normal ACK/NACK feedback timing, to the subframe in the nearest next second zone to transmit the feedback, wherein D2D neighbor discovery user equipment determines the user equipments as a first type of user equipment or a second type of user equipment according to a downlink reference signal measuring result and a threshold parameter sent by the base station, and wherein
the resource in the first zone is configured for the first type of user equipment and the first type of user equipment locates at the center of a cell and is configured to be just able to use the resource in the restricted D2D resource zone of the first zone for D2D transmission;
the resource in the second zone is configured for the second type of user equipment, and the second type of user equipment locates at the edge of the cell and is configured to be just able to use the resource in the unrestricted D2D resource zone of the second zone for D2D transmission.

13. A base station of a wireless communication system, the method base station comprising:
at least one processor; and
at least one memory including computer program code, the at least one processor and computer program code configured to, with the at least one processor, cause the base station to perform:
sending a first message to an associated user equipment to configure a device-to-device ( D2D) discovery resource pool as a resource pool including a first zone and a second zone, wherein the first zone is a restricted D2D resource zone and the second zone is an unrestricted D2D resource zone, and wherein the first zone and the second zone possess an interleaving arrangement;
dividing user equipments communicatively connected to the base station into two groups according to a specification version of the user equipments, wherein a first group is the user equipment using a specification version before release 12 and a second group is the user equipment using a specification version of release 12 or a specification version after release 12; and
the base station performing restricted downlink data scheduling within the timing associated with the configured D2D discovery resource pool for the user equipments in the first group, such that feedback of the data scheduling can be transmitted on the subframe in the second zone which is an unres,ricted D2D resource zone and/or the base station performing normal downlink data scheduling in the timing associated with the configured D2D discovery resource pool for the user equipments in the second group and adjusting the feedback timing of the user equipments, which needs to transmit feedback on the subframe in the first zone according to normal ACK/NACK feedback sequence, to the subframe in the nearest next second zone to transmit the feedback.

14. A base station of a wireless communication system, the method base station comprising:
at least one processor; and
at least one memory including computer program code, the at least one processor and computer program code configured to, with the at least one processor, cause the base station to perform:
sending a first message to a user equipment to configure a D2D discovery resource pool as a resource pool including a first zone and a second zone, wherein the first zone is a restricted D2D resource zone and the second zone is an unrestricted D2D resource zone, and wherein the first zone sand the second zone possess an interleaving arrangement, wherein D2D neighbor discovery user equipment determines the user equipments as a first type of user equipment or a second type of user equipment according to a downlink reference signal measuring result and a threshold parameter sent by the base station, and wherein
the resource in the first zone is configured for the first type of user equipment, and the first type of user equipment locates at the center of a cell and is configured to be just able to use the resource in the restricted D2D resource zone of the first zone for D2D transmission;
the resource in the second zone is configured for the second type of user equipment, and the second type of user equipment locates at the edge of the cell and is configured to be just able to use the resource in the unrestricted D2D resource zone of the second zone for D2D transmission.

* * * * *